United States Patent
Tanaka et al.

(10) Patent No.: US 11,380,009 B2
(45) Date of Patent: Jul. 5, 2022

(54) PHYSIQUE ESTIMATION DEVICE AND POSTURE ESTIMATION DEVICE

(71) Applicant: AISIN CORPORATION, Aichi (JP)

(72) Inventors: Godai Tanaka, Kariya (JP); Yoshiaki Tomatsu, Kariya (JP); Takayuki Nakagome, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/070,050

(22) Filed: Oct. 14, 2020

(65) Prior Publication Data

US 2021/0150754 A1 May 20, 2021

(30) Foreign Application Priority Data

Nov. 15, 2019 (JP) .............................. JP2019-206877

(51) Int. Cl.
*G06T 7/73* (2017.01)
*G06V 20/59* (2022.01)
*G06V 40/10* (2022.01)

(52) U.S. Cl.
CPC ................ *G06T 7/73* (2017.01); *G06V 20/59* (2022.01); *G06V 40/103* (2022.01); *G06T 2207/20081* (2013.01); *G06T 2207/30196* (2013.01); *G06T 2207/30268* (2013.01)

(58) Field of Classification Search
CPC ............. G06T 7/73; G06T 2207/20081; G06T 2207/30268; G06T 2207/30196; G06K 9/00369; G06K 9/00832; G06K 9/44; G06K 9/00838
See application file for complete search history.

(56) References Cited

U.S. PATENT DOCUMENTS

| | | | |
|---|---|---|---|
| 2005/0173904 A1* | 8/2005 | Morikawa | B60N 2/002 280/735 |
| 2007/0289799 A1* | 12/2007 | Aoki | G06K 9/00201 180/271 |
| 2013/0251203 A1* | 9/2013 | Tanabiki | G06K 9/00369 382/103 |
| 2016/0257273 A1* | 9/2016 | Tada | B60R 21/01512 |
| 2017/0197523 A1* | 7/2017 | Magana | B60N 2/2213 |

(Continued)

FOREIGN PATENT DOCUMENTS

| | | |
|---|---|---|
| JP | 2018-147313 A | 9/2018 |
| JP | 2019-148865 A | 9/2019 |
| JP | 2020-47273 A | 3/2020 |

*Primary Examiner* — Ming Y Hon
(74) *Attorney, Agent, or Firm* — Oblon, McClelland, Maier & Neustadt, L.L.P.

(57) ABSTRACT

A physique estimation device includes: a camera capturing an image of an inside of a vehicle; a skeleton point coordinate acquisition unit acquiring positions of skeleton points of a body image of an occupant included in a captured image of the inside as skeleton point coordinates in a two-dimensional coordinate system of the captured image; a front coordinate estimation unit machine learned such that, by receiving a distance between preset skeleton points and an angle of a skeleton line obtained by connecting the skeleton points with respect to a reference line, a front coordinate that is an arrangement of the skeleton points when the occupant is viewed from front is estimated and output; and a physique determination unit determining a physique of the occupant based on the front coordinate.

11 Claims, 10 Drawing Sheets

(56) References Cited

U.S. PATENT DOCUMENTS

| | | | |
|---|---|---|---|
| 2019/0021653 A1* | 1/2019 | Arandia | G06V 40/103 |
| 2019/0266425 A1 | 8/2019 | Iwai et al. | |
| 2019/0278985 A1* | 9/2019 | Liu | G06K 9/00892 |
| 2019/0325603 A1* | 10/2019 | Nogimori | G06K 9/00838 |
| 2019/0378191 A1* | 12/2019 | Sekiyama | G06Q 30/06 |
| 2020/0034659 A1* | 1/2020 | Sato | G06T 7/00 |
| 2020/0090299 A1 | 3/2020 | Uno et al. | |
| 2020/0282867 A1* | 9/2020 | Yi | G06N 3/0454 |

\* cited by examiner

PHYSIQUE ESTIMATION DEVICE AND POSTURE ESTIMATION DEVICE

CROSS REFERENCE TO RELATED APPLICATIONS

This application is based on and claims priority under 35 U.S.C. § 119 to Japanese Patent Application 2019-206877, filed on Nov. 15, 2019, the entire content of which is incorporated herein by reference.

TECHNICAL FIELD

This disclosure relates to a physique estimation device that estimates a physique of an occupant imaged by a camera that captures an image of an inside of a vehicle, and a posture estimation device that estimates a posture of the occupant.

BACKGROUND DISCUSSION

As a technology related to a device that estimates a physique, JP 2019-148865A (Reference 1) describes a device including an identification unit that captures an image of an occupant of a vehicle (moving object in Reference 1) with a camera (imaging unit in Reference 1), derives a distance to a feature point of the occupant by an optical time-of-flight distance measurement method, and identifies a posture of the occupant based on distances to a plurality of feature points.

In Reference 1, a skeleton position of each part such as a head and a torso of a driver is estimated as a feature point, and the identification unit identifies a posture and movement of the driver from a three-dimensional coordinate of each feature point. Reference 1 discloses that in this identification, a basic posture of the driver may be registered and the posture may be identified based on a change from the basic posture.

JP 2018-147313A (Reference 2) describes a device in which a skeleton generation unit generates a skeleton of an occupant from a frame image instead of capturing an image of an inside of a vehicle, each body joint and each body part such as a head, a torso, a shoulder of the occupant (person in Reference 2) are estimated to estimate a posture of the occupant.

When a passenger car is described as an example, it is possible to grasp a driving state from a driving posture of the driver seated in a driver seat, and a posture of an upper body of the driver seated in the driver seat is important from a viewpoint of protecting the driver when an air bag is activated.

Further, in a vehicle provided with side air bags, it is desirable to prevent a posture of an upper body of an occupant seated in an assistant passenger seat or a rear passenger seat from leaning against inner walls on which the side air bags are disposed.

Therefore, it is conceivable to output a necessary message to the driver or the occupant by grasping the physique and the posture of the occupant in the vehicle. The technique described in Reference 1 uses a device that processes the occupant as the three-dimensional coordinate, which leads to an increase in cost. In the technique of Reference 1, for example, when an arm is in a position where the arm is hidden by the torso on the image, distance measurement cannot be performed correctly, and a relationship between distance measurement information and the feature point may not match because the three-dimensional coordinate is used.

Further, in Reference 2, the posture of the occupant is estimated from a database, teacher data for a feature amount in the database, and positions of each part and each joint of the body in the database. However, a body shape of the occupant is not acquired from front of the occupant.

A need thus exists for a device which is not susceptible to the drawback mentioned above.

SUMMARY

A feature configuration of a physique estimation device according to this disclosure includes a camera configured to capture an image of an inside of a vehicle, a skeleton point coordinate acquisition unit configured to acquire positions of a plurality of skeleton points of a body image of an occupant included in a captured image obtained by capturing an image of the inside by the camera as skeleton point coordinates in a two-dimensional coordinate system of the captured image, a front coordinate estimation unit machine learned such that, by receiving distance information that is a distance between a plurality of preset skeleton points among the plurality of skeleton points specified by the skeleton point coordinates and angle information that is an angle of a skeleton line obtained by connecting the plurality of the skeleton points specified by the skeleton point coordinates with respect to a reference line, a front coordinate that is an arrangement of the skeleton points when the occupant is viewed from front is estimated and output, and a physique determination unit configured to determine a physique of the occupant based on the front coordinate estimated by the front coordinate estimation unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described below with reference to the drawings.

[Overall Configuration]

Figure 1:
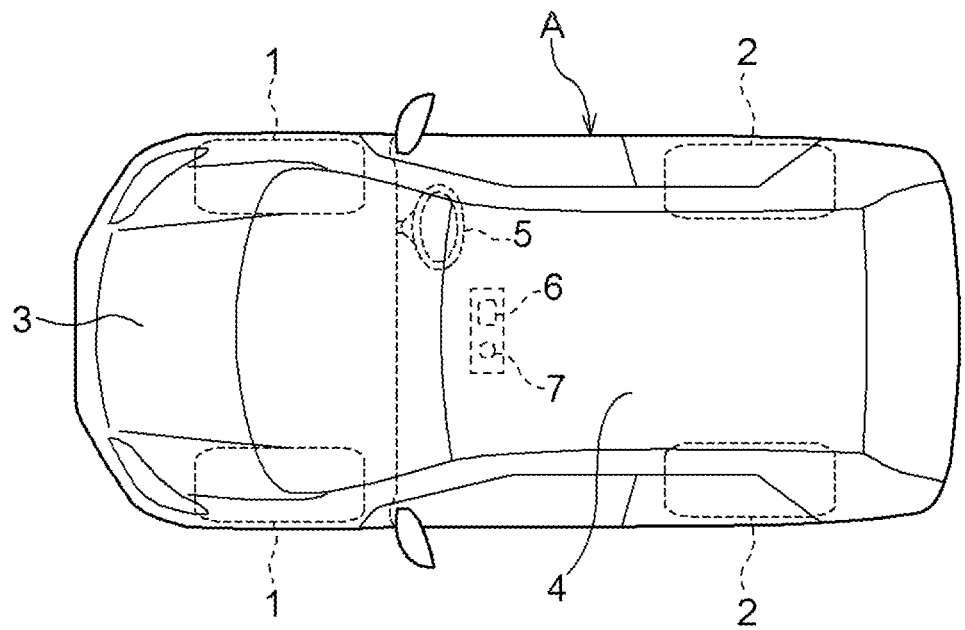
FIG. 1 is a plan view of a passenger car.
Figure 2:
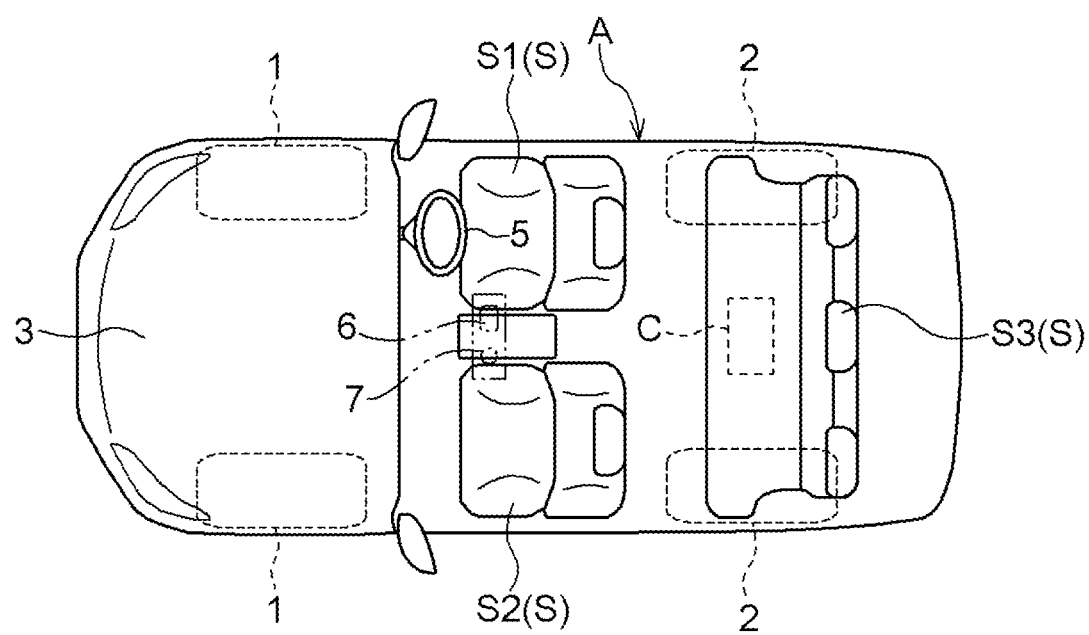
FIG. 2 is a plan view illustrating an arrangement of seats of the passenger car.

As illustrated in FIGS. 1 and 2, a passenger car (an example of a vehicle) includes an engine bonnet 3 disposed in a front portion of a vehicle body A including a pair of left and right front wheels 1 and a pair of left and right rear wheels 2, and a plurality of seats (superior concept of a driver seat S1, an assistant passenger seat S2, a rear seat S3 to be described later) in a room under a roof 4 in a region extending from a center to a rear end of the vehicle body A.

As illustrated in FIG. 2, the plurality of seats arranged in the room include the driver seat S1 disposed on one side in a left-right direction of the front portion, the assistant passenger seat S2 disposed next to the driver seat S1, and the bench seat type rear seat S3 disposed at a rear position. A steering wheel 5 is disposed on a front side of the driver seat S1.

In this passenger car, the driver seat S1 and the assistant passenger seat S2 are configured such that a front-rear position and a vertical position of each seat base and a leaning posture of each seat back can be freely controlled by a seat control unit 8 (see FIG. 3) including an electric motor.

As illustrated in FIGS. 1 and 2, an overhead console is provided at a front position of an underside of the roof 4. The overhead console includes a camera 6 capable of taking infrared images and a light 7 that illuminates infrared rays. The vehicle body A includes a human body information processing device C (an example of a physique estimation device) that specifies seating positions of occupants (including a driver) from the images captured by the camera 6, acquires skeleton point coordinates of a plurality of locations from a body image of each occupant, and estimates a skeleton of the occupant. Further, the body image is an image obtained by cutting out a region where the occupant is present from the captured image.

[Human Body Information Processing Device]

Figure 3:
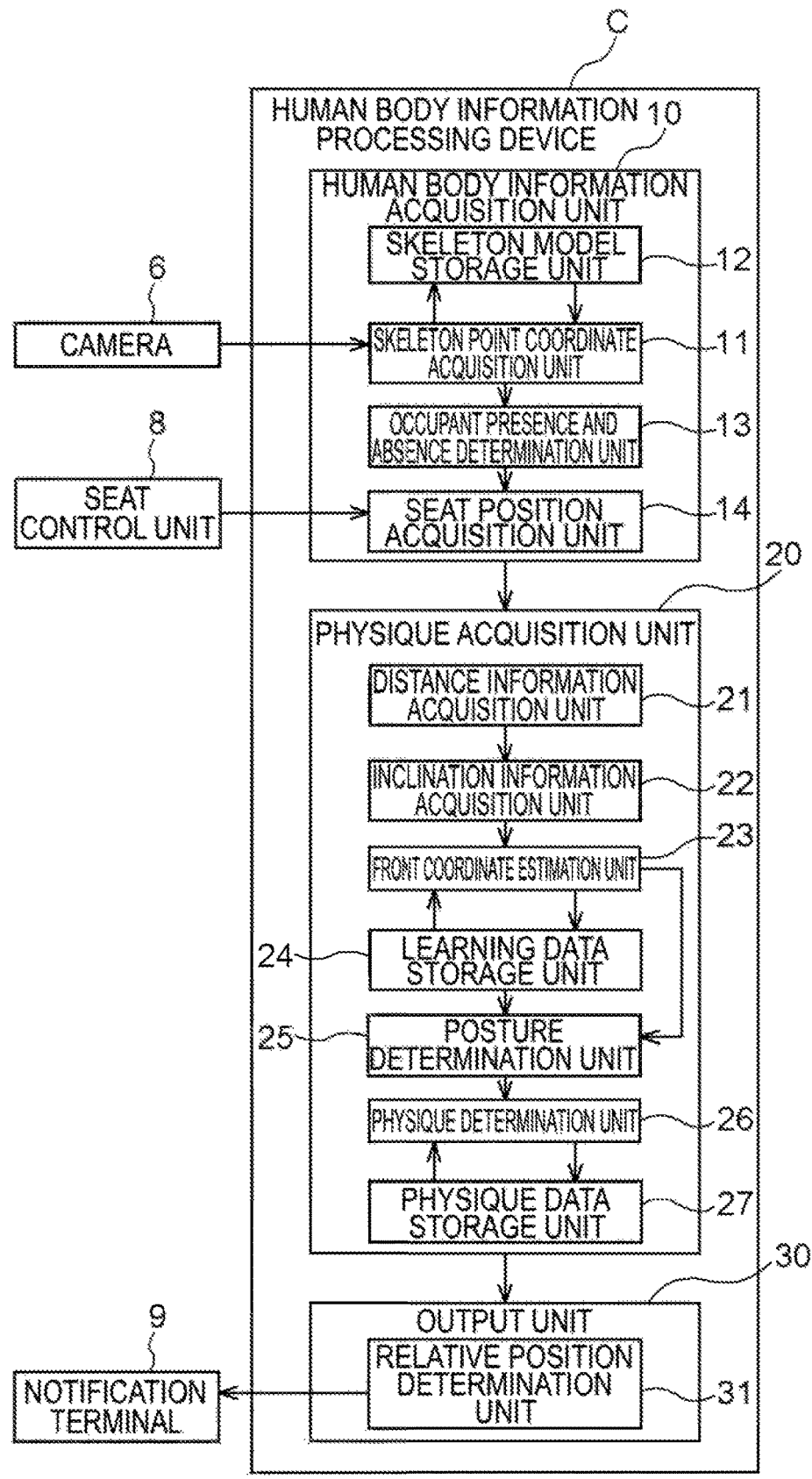
FIG. 3 is a block circuit diagram of a human body information processing device.

As illustrated in FIG. 3, the human body information processing device C includes a human body information acquisition unit 10, a physique acquisition unit 20, and an output unit 30. The human body information acquisition unit 10, the physique acquisition unit 20, and the output unit 30 are formed by software, and a semiconductor memory is used as a part that stores data. Further, a part of the human body information acquisition unit 10, the physique acquisition unit 20, and the output unit 30 may be formed by hardware such as a logic circuit.

[Human Body Information Processing Device: Human Body Information Acquisition Unit]

The human body information acquisition unit includes a skeleton point coordinate acquisition unit 11, a skeleton model storage unit 12, an occupant presence and absence determination unit 13, and a seat position acquisition unit 14.

Figure 4:
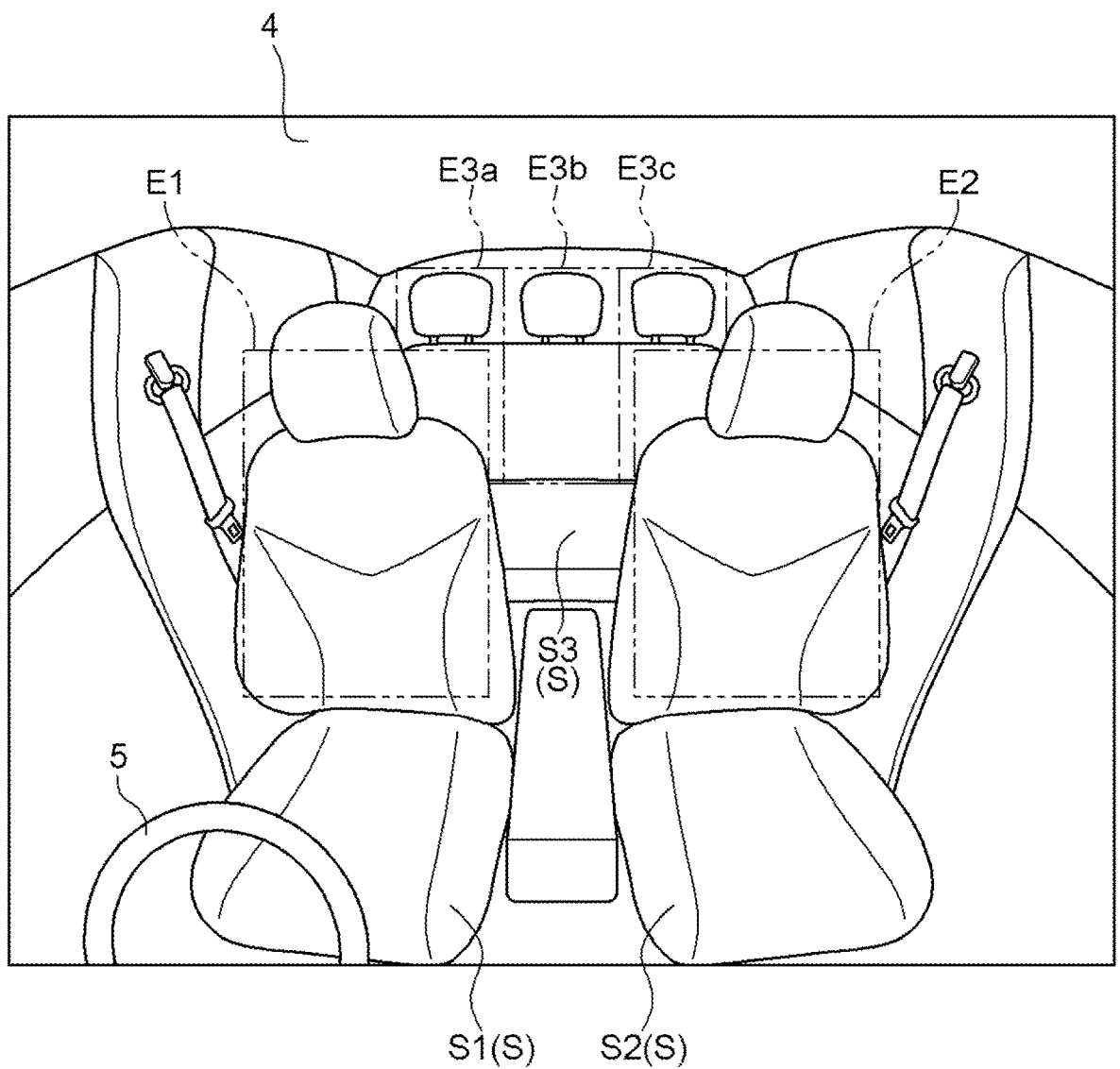
FIG. 4 is a captured image of an inside of the car captured with a camera.

The skeleton point coordinate acquisition unit 11 acquires skeleton points of an occupant seated in any of the plurality of seats S from the image captured by the camera 6. Here, the plurality of seats include the driver seat S1, the assistant passenger seat S2, and the rear seat S3. The skeleton points of the occupant present in any of five regions of a first region E1, a second region E2, and three third regions E3a, E3b, and E3c which are illustrated in FIG. 4 are acquired.

When skeleton point coordinates are acquired in this processing, the occupant presence and absence determination unit 13 determines that the occupant is present at a position where the skeleton point coordinates are acquired in a two-dimensional coordinate system of the captured image. The skeleton point coordinate acquisition unit 11 acquires the skeleton point coordinates in a region of the two-dimensional coordinate system where it is determined that the occupant is present.

Figure 5:
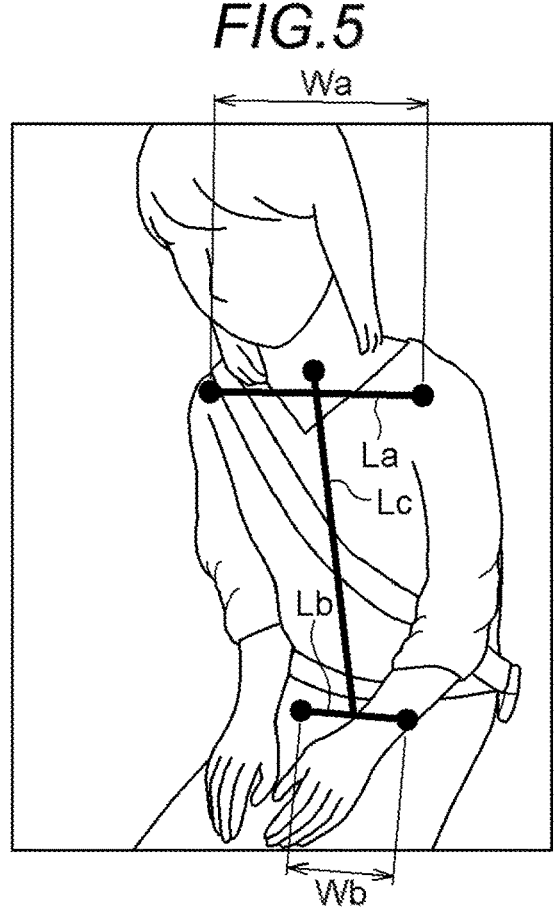
FIG. 5 illustrates a body image, skeleton points and the like of an occupant in a posture.

For example, the skeleton point coordinate acquisition unit 11 acquires the skeleton point coordinates of the occupant as illustrated in FIG. 5. In this figure, with the body image of the occupant and skeleton point coordinates superimposed, joint positions of left and right shoulders, joint positions (hip joint positions) of left and right portions of a waist, and a joint position of neck are extracted, and the extracted positions are illustrated by dots.

As illustrated in FIG. 5, a line obtained by connecting the joint positions of the left and right shoulders is illustrated as a shoulder line La (an example of a skeleton line), a line obtained by connecting the joints of the left and right portions of the waist is illustrated as a waist line Lb (an example of skeleton line), and a line extending from a middle of the waist line Lb to a spine is illustrated as a spine line Lc. Further, the spine line Lc can be regarded as a straight line in a vertical posture along the spine of the occupant.

The skeleton point coordinate acquisition unit has a function of obtaining coordinates of a plurality of joint positions of a human body from the captured image by known skeleton recognition processing. In the skeleton recognition processing, the coordinate of each joint position is determined with reference to a skeleton model stored in the skeleton model storage unit 12.

The skeleton point coordinate acquisition unit 11 can also acquire elbow joints, wrist joints, knee joints, and ankle joints. Since processing performed by the physique acquisition unit 20 requires the above-described shoulder line La, the waist line Lb, and the spine line Lc, these pieces of information are acquired in the two-dimensional coordinate system coordinates on an X-Y plane).

The camera 6 has a function of acquiring a video. The skeleton point coordinate acquisition unit 11 acquires a captured image (frame) from the video, and acquires and updates positions of a plurality of skeleton points of the acquired captured image as skeleton point coordinates at the same rate as the frame rate of the video.

As illustrated in FIG. 4, the captured image inside the vehicle is acquired by the camera 6. When the skeleton point coordinate acquisition unit 11 cannot acquire the skeleton point coordinates, the occupant presence and absence determination unit 13 determines that there is no occupant in the vehicle. When the skeleton point coordinates can be acquired, the occupant presence and absence determination unit 13 determines which of the five regions of the first region E1, the second region E2, and the three third regions E3a, E3b, and E3c illustrated in the same figure the occupant is in.

The above-described skeleton point coordinate acquisition unit 11 adds identification information for identifying which region the acquired skeleton points belong to. By adding the identification information in this way, even when the occupant is seated in any of the plurality of seats S, correction corresponding to the seats S is performed when a front coordinate is acquired from the skeleton point coordinates.

That is, the camera 6 captures the image with a wide-angle lens. When the camera 6 captures an image of the occupant seated in the seat S based on a positional relationship between the plurality of seats S and the camera 6, even if the occupant is at a posture facing the front, the occupant in the image may be captured diagonally from the front, or a part of a body may be deformed. For this reason, when a front image is estimated, a position of the seat S on which the occupant sits is identified based on the identification information, and the human body information acquisition unit 10 (an example of a correction unit) performs correction such as coordinate conversion of the skeleton point coordinates to acquire skeleton point coordinates for a plurality of occupants similar to skeleton point coordinates of occupants seated in the seats S assumed in advance based on seat position information acquired by the seat position acquisition unit 14 to be described later.

Even when either the driver seat S1 or the assistant passenger seat S2 is controlled by the seat control unit 8, the seat position acquisition unit 14 acquires positions in the front-rear direction and heights of the seat bases and inclination angles of the seat backs set based on control information of the seat control unit 8 as the seat position information. A dedicated sensor for acquiring the positions in the front-rear direction and the heights of the seat bases and the inclination angles of the seat backs may be used as the seat position acquisition unit 14.

In this way, with the human body information acquisition unit 10, based on the information from the seat control unit 8, a relative distance between the occupant seated in either of the driver seat S1 or the assistant passenger seat S2 and the camera 6 can be accurately grasped, and a correction value corresponding to the distance between the occupant seated in either of the driver seat S1 or the assistant passenger seat S2 and the camera 6 is set to correct and output the above-described skeleton point coordinates.

[Human Body Information Processing Device: Physique Acquisition Unit]

As illustrated in FIG. 3, the physique acquisition unit 20 includes a distance information acquisition unit 21, an inclination information acquisition unit 22, a front coordinate estimation unit 23, a learning data storage unit 24, a posture determination unit 25, a physique determination unit 26, and a physique data storage unit 27 (an example of a physique storage unit).

FIG. 5 illustrates a body image obtained by capturing an image of the occupant sitting in a normal posture (hereinafter referred to as a reference posture) on a predetermined seat S from an oblique angle by the camera 6. The shoulder line La and the waist line Lb are horizontal, and the spine line Lc extends in a vertical direction.

Based on the positional relationship between the camera 6 and the seat S and characteristics of image pickup lens of the camera 6, in the captured image, the shoulder line La and the waist line Lb are not horizontal, and the spine line Lc does not extend in the vertical direction. However, in the physique acquisition unit 20, these are processed as the shoulder line La and the waist line Lb being horizontal and the spine line Lc extending in the vertical direction.

The distance information acquisition unit 21 acquires distance information on skeleton points (skeleton point coordinates) of the left and right shoulders of the occupant. That is, illustrated in FIG. 5, when the occupant in the reference posture is a physique acquisition target and the joints of the left and right shoulders of the occupant are the skeleton points (skeleton point coordinates), the distance information (length of the shoulder line La) between the skeleton, points in the captured image is acquired as shoulder distance Wa (an example of the distance information), and when the joints of the left and right portions of the waist are the skeleton points (skeleton point coordinates), the distance information (length of the waist line Lb) between the skeleton points is acquired as a waist distance Wb (an example of the distance information).

The shoulder distance Wa and the waist distance Wb are acquired by taking the lengths of the skeleton lines, which are obtained by connecting the two joints serving as the skeleton point coordinates with straight lines, as the distance information based on a pixel pitch (pixel spacing) of the captured image. That is, all of a forward leaning, shoulder distance Wax (distance information) of FIG. 6, a lateral leaning shoulder distance Way (distance information) of FIG. 7, and a twisted shoulder distance Waz (distance information) of FIG. 8 to be described later are acquired as the distance information based on the pixel pitch in the same manner.

Further, all of a forward leaning waist distance Wbx (distance information) of FIG. 6, a lateral leaning waist distance Wby (distance information) of FIG. 7, and a twisted waist distance Wbz (distance information) of FIG. 8 to be described later are acquired as the distance information based on the pixel pitch in the same manner.

Figure 6:
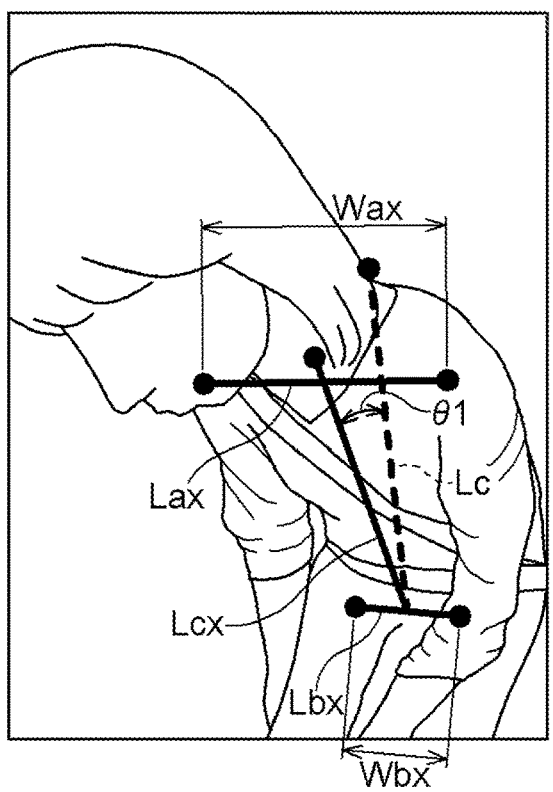
FIG. 6 illustrates a body image, skeleton points, and the like of the occupant in a forward leaning posture.

FIG. 6 illustrates a body image in which an upper body of the occupant seated in the predetermined seat is in a forward leaning posture. The same figure illustrates a line obtained by connecting the skeleton points (skeleton point coordinates) of the left and right shoulders as a forward leaning shoulder line Lax (an example of the skeleton line), a line obtained by connecting the skeleton points (skeleton point coordinates) of the left and right portions of the waist as a forward leaning waist line Lbx (an example of the skeleton line), and the spine as a forward leaning spine line Lcx. In the forward leaning posture, the forward leaning spine line Lcx is forward leaned by a forward leaning angle θ1 (an example of angle information) as compared with the spine line Lc in the reference posture.

Further, the distance information acquisition unit 21 acquires a length of the forward leaning shoulder line Lax as the forward leaning shoulder distance Wax (an example of the distance information), and acquires a length of the forward leaning waist line Lbx as the forward leaning shoulder distance Wax (an example of the distance information).

Figure 7:
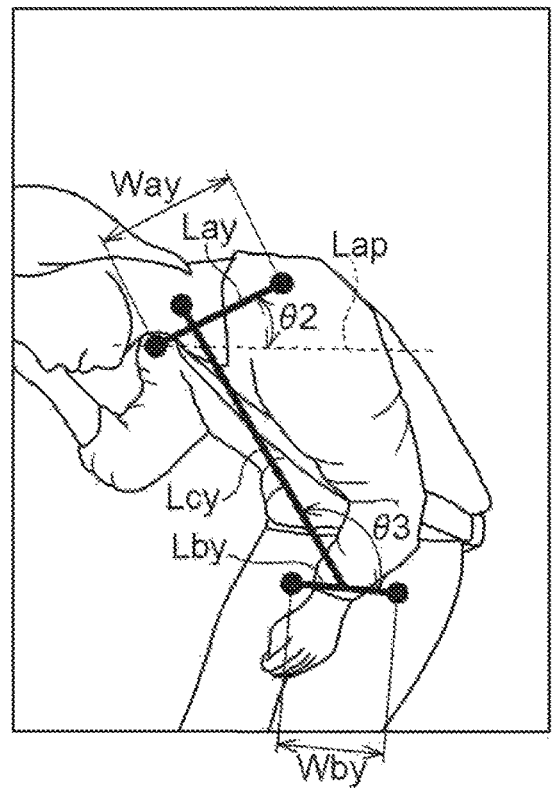
FIG. 7 illustrates a body image, skeleton points, and the like of the occupant in a lateral leaning posture.

FIG. 7 illustrates a body image in which the upper body of the occupant seated in the predetermined seat S is in a lateral leaning posture. The same figure illustrates a line obtained by connecting the skeleton points (skeleton point coordinates) of the left and right shoulders as a lateral leaning shoulder line Lay (skeleton line), a line obtained by connecting the skeleton points (skeleton point coordinates) of the left and right portions of the waist as a lateral leaning waist line Lby (skeleton line), and a spine as a lateral leaning spine line Lcy.

Accordingly, the distance information acquisition unit 21 acquires a length of the lateral leaning shoulder line Lay as the lateral leaning shoulder distance Way (distance information), and acquires a length of the lateral leaning waist line Lby as the lateral leaning waist distance Wby (distance information).

Further, as illustrated in FIG. 7, the lateral leaning shoulder line Lay is inclined with respect to a reference line Lap that is parallel to the shoulder line La of the reference posture by a lateral leaning shoulder angle θ2 (angle information), and the lateral leaning spine line Lcy is inclined with respect to the waist line Lby by a lateral leaning waist angle θ3 (angle information).

Figure 8:
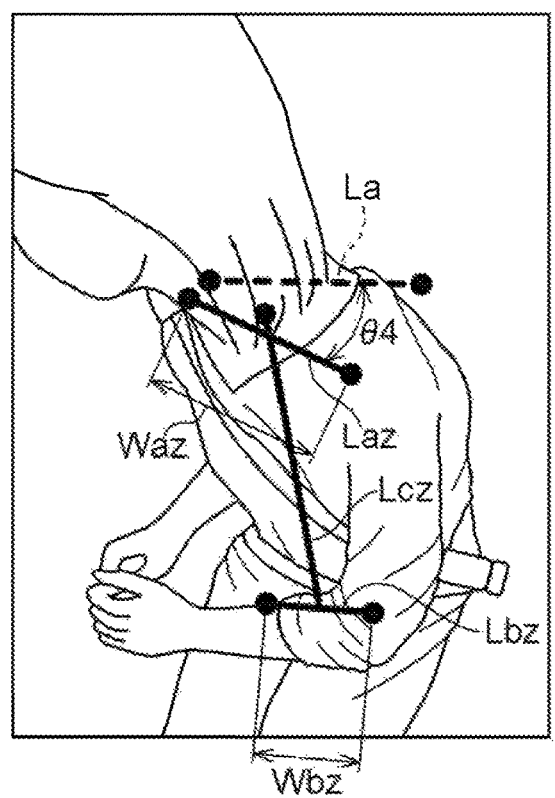
FIG. 8 illustrates a body image, skeleton points, and the like of the occupant in a twisted posture.

FIG. 8 illustrates a body image in which the upper body of the occupant seated in the predetermined seat S is in a twisted posture. The same figure illustrates a line obtained by connecting the skeleton points (skeleton point coordinates) of the left and right shoulders as a twisted shoulder line Laz (skeleton line), a line obtained by connecting the skeleton points (skeleton point coordinates) of the left and right portions of the waist as a twisted waist line Lbz (skeleton line), and the spine as a twisted spine line Lcz. In this twisted posture, in FIG. 8 the twisted shoulder line Laz is inclined with respect to the shoulder line La of the reference posture by a twisted angle θ4 (angle information).

Accordingly, the distance information acquisition unit 21 acquires a length of the twisted shoulder line Laz as the twisted shoulder distance Waz (distance information), and acquires a length of the twisted waist line Lbz as the twisted waist distance Wbz (distance information).

In this distance intonation acquisition unit 21, when the posture of the occupant is changed from a position where the posture of the occupant is the reference posture due to the control to the driver seat S1 or the assistant passenger seat S2, as described above, since the skeleton point coordinates are corrected by the human body information acquisition unit 10 (an example of the correction unit), distance information such as the corrected shoulder distance Wa can be acquired, and it is also conceivable to correct the distance information such as the shoulder distance Wa based on the seat position information from the seat position acquisition unit 14.

As illustrated in FIG. 5, the inclination information acquisition unit 22 acquires 0 degree as the angle information when the upper body of the occupant is in the reference posture that is not inclined in any direction. As illustrated in FIG. 6, when the upper body of the occupant is in the forward leaning posture, the forward leaning angle θ1 is acquired. As illustrated in FIG. 7, when the upper body of the occupant is in the lateral leaning posture, the lateral leaning shoulder angle 62 and the lateral leaning waist angle θ3 are acquired. As illustrated in FIG. 8, when the upper body of the occupant is in the twisted posture, the twisted angle θ4 is acquired.

The front coordinate estimation unit 23 estimates the front coordinate that is an arrangement of the skeleton points when the occupant is viewed from the front from the captured image with reference to learning data of the learning data storage unit 24 and based on the distance information acquired by the distance information acquisition unit 21 and the angle information acquired by the inclination information acquisition unit 22.

That is, the front coordinate estimation unit 23 performs machine learning by receiving the distance information that is a distance between a plurality of preset skeleton points among the plurality of skeleton points specified by the skeleton point coordinates, and the angle information that is an angle of a skeleton line obtained by connecting the plurality of the skeleton points specified by the skeleton point coordinates with respect to the reference line, so that the front coordinate in the two-dimensional coordinate system that is the arrangement of the skeleton points when the occupant is viewed from the front is estimated and output.

The learning data storage unit 24 stores a parameter that enables the estimation of the front coordinate based on the distance information and inclination information of the skeleton point coordinates of the captured image. Specifically, a conversion parameter for converting the coordinates of the plurality of skeleton points in the captured image into the front coordinate, or a position correction parameter for correcting the coordinates of the plurality of skeleton points in the captured image in an X-Y direction of the two-dimensional coordinate system is stored. Further, as the learning data, since a predetermined reference point is used as a reference in the two-dimensional coordinate system, a vector parameter for specifying the coordinate of each skeleton point may be used.

The posture determination unit 25 determines a displacement amount of the upper body of the occupant based on the front coordinate acquired by the front coordinate estimation unit 23 and the angle information acquired by the inclination information acquisition unit 22. That is, the front coordinate is in the basic posture when the occupant is viewed from the front. A position of a head can be easily acquired in this basic posture, and the posture determination unit 25 acquires a position of the head when the upper body of the occupant in the basic posture is inclined by an angle corresponding to the angle information.

Therefore, for example, as illustrated in FIG. 6, when the forward leaning spine line Lcx of the upper body of the occupant leans forward by the forward leaning angle as compared with the spine line Lc of the reference posture, a displacement amount of the upper body to a front side is acquired based on this forward leaning angle θ1.

Further, as illustrated in FIG. 7, the upper body of the occupant is in the lateral leaning posture. When the lateral leaning shoulder line Lay is inclined by the lateral leaning shoulder angle θ2 with respect to the reference line Lap, and the lateral leaning spine line Lcy is inclined by the lateral leaning waist angle θ3 with respect to the waist line Lby, the posture determination unit 25 easily acquires a displacement amount of the upper body in a lateral direction.

Similarly, as illustrated in FIG. 7, when the lateral leaning spine line Lcy is inclined by the lateral leaning waist angle θ3 with respect to the waist line Lby, the posture determination unit 25 acquires a displacement amount of the upper body based on this lateral leaning waist angle θ3.

The physique determination unit 26 determines a physique by processing based on the distance information (distance information of the reference posture illustrated in FIG. 5) of the skeleton point coordinates of the front coordinate estimated by the front coordinate estimation unit 23, referring to table information, and calculating the distance information, and acquires physique information with reference to the physique data storage unit 27 with the determined physique.

The physique data storage unit 27 stores a plurality of types of physiques (for example, physiques divided by Subpart of the US NHTSA standard (49 CFR Part 572)) or physiques divided into AF05, AM50, AM95, and the like as human body model standards. The physique determination unit 26 determines which of the plurality of types of physiques stored in the physique data storage unit 27 the physique determined as described above belongs to, and outputs a determination result as the physique information.

[Human Body Information Processing Device: Output Unit]

The Output unit 30 includes a relative position determination unit 31, and outputs information to a notification terminal 9 outside the human body information processing device C.

For example, when an upper body of the driver is in a posture where the driver may receive a strong impact when an air bag is activated, or when the head of the occupant is in a direction close to a side air bag, the relative position determination unit 31 outputs, based on the displacement amount of the upper body determined by the posture determination unit 25 and the physique information output from the physique determination unit 26, a message for correcting the posture to the notification terminal 9.

[Processing Mode of Human Body Information Processing Device]

Figure 9:
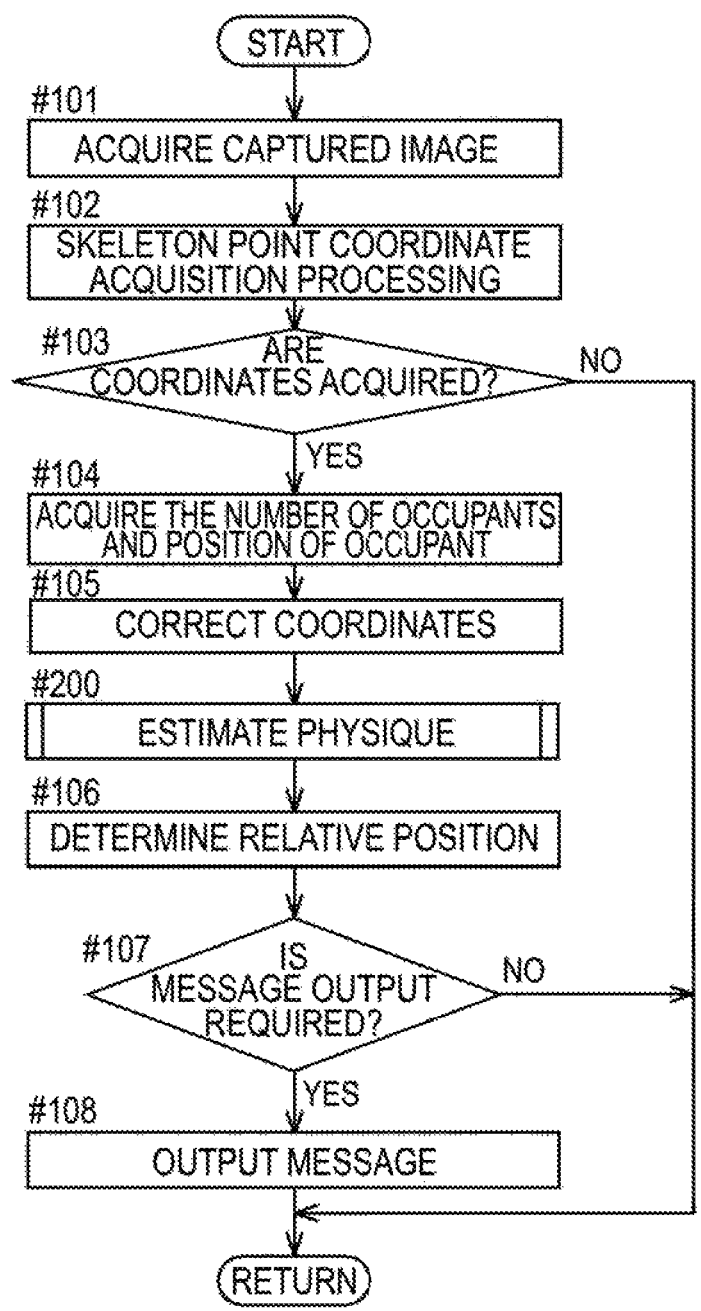
FIG. 9 is a flowchart showing a processing mode of the human body information processing device.

In a processing mode of the human body information processing device C, as illustrated in a flowchart of FIG. 9, the skeleton point coordinate acquisition unit 11 acquires the skeleton point coordinates based on the acquired captured image (steps #101 and #102).

When the occupant presence and absence determination unit 13 determines that the skeleton point coordinates cannot be acquired in this processing (No in step #103), this control is returned. When the skeleton point coordinates can be acquired (Yes in step #103), the occupant presence and absence determination unit 13 specifies the number of occupants and positions of the occupants (step #104).

That is, in step #103, it is determined that whether there is the driver (occupant) in the driver seat S1 in the first region E1 illustrated in FIG. 4, whether there is an occupant in the assistant passenger seat 32 in the second region E2, and whether there are occupants in the three third regions E3a, E3b, and E3c of the rear seat S3. It is recognized that there is, an occupant only when it is determined that there is an occupant.

Further, based on, the seat position information acquired by the seat position acquisition unit 14 and the identification information, the skeleton point coordinates are corrected for each of the identified seats S (step #105). By this correction, the same skeleton point coordinates as those of the occupant sitting at the position assumed in advance are obtained for each of the plurality of occupants.

Next, the physique of the occupant is estimated from the captured image (step #200). After the physique and the posture of the occupant are acquired in this step #200, a relative position is determined based on the determination of the posture determination unit 25 (step #106). As the determination of this relative position, a relative position between the driver (occupant) and the steering wheel 5 and a relative positional relationship between the occupant and the side air bag are determined.

As a result of this determination, when a message output is not necessary (No in step #107), this control is returned, and when the message output is necessary (Yes in, step #107), information is output from the notification terminal 9.

Figure 10:
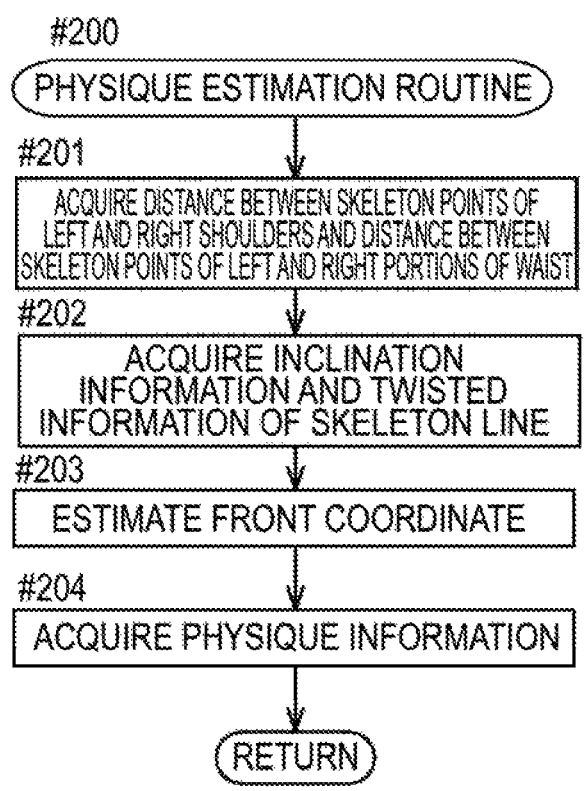
FIG. 10 is a flowchart of a physique estimation routine.

Step #200 is a subroutine. In a processing mode thereof, as illustrated in a flowchart of FIG. 10, the distance information acquisition unit 21 acquires the distance between the skeleton point coordinates of the left and right shoulders and the distance between the skeleton point coordinates of the left and right portions of the waist (examples of the distance of the skeleton points), and acquires the inclination angle or a twisted angle of the skeleton line (steps #201 and #202).

In step #201, for example, corresponding to the captured images illustrated in FIGS. 5 to 8, the length of the shoulder line La is acquired as the shoulder distance Wa, and the length of the forward leaning shoulder line Lax is acquired as the forward leaning shoulder distance Wax. Further, the length of the lateral leaning shoulder line Lay is acquired as the lateral leaning shoulder distance Way, and the length of the twisted shoulder line Laz is acquired as the twisted shoulder distance Waz. The distance information is acquired as the distance information based on the pixel pitch.

Similarly, for example, corresponding to the captured images illustrated in FIGS. 5 to 8, the length of the waist line Lb is acquired as the waist distance Wb, and the length of the forward leaning waist line Lbx is acquired as the forward leaning waist distance Wbx. Further, the length of the lateral leaning waist line Lby is acquired as the lateral leaning waist distance by, and the length of the twisted waist line Lbz is acquired as the twisted waist distance Wbz. The distance information is acquired as the distance information based on the pixel pitch.

In step #202, the forward leaning angle θ1 is acquired from the body image (captured image) illustrated in FIG. 6, the lateral leaning shoulder angle 82 and the lateral leaning waist angle θ3 are acquired from the body image (captured image) illustrated in FIG. 7, and the twisted angle θ4 is acquired from the body image (captured image) illustrated in FIG. 8.

The front coordinate estimation unit 23 estimates the front coordinate that is the arrangement of the skeleton points when the occupant is viewed from the front from the captured image with reference to learning data of the learning data storage unit 24 and based on the distance information acquired by the distance information acquisition unit 21 and the plurality of skeleton point coordinates (step #203).

The occupant in the captured image is assumed to be in the reference posture, the forward leaning posture, the lateral leaning posture, the twisted posture, and a composite posture that is a combination of at least two postures of the forward leaning posture, the lateral leaning posture, and the twisted posture. Therefore, the front coordinate estimation unit 23 converts the coordinates of the plurality of skeleton points of the captured image into the front coordinate by using the conversion parameter of the learning data storage unit 24.

Next, based on the front coordinate estimated by the front coordinate estimation unit 23, the physique determination unit 26 determines, with reference to the physique information of the physique data storage unit 27, to which piece of the physique information divided into the plurality of types, such as AF05, AM50, and AM95, the physique of the occupant of the captured image belongs (step #204).

In this way, after the physique information is acquired, the output unit 30 outputs information such as a necessary message to the notification terminal 9 based on the acquired physique data and the angle information acquired by the inclination information acquisition unit 22. The notification terminal 9 is formed by a display that outputs information such as characters and icons, or a speaker that outputs voice. Accordingly, for example, when the upper body of the driver is in the posture where the driver may receive a strong impact when the air bag is activated, or when the head of the occupant is in a direction close to the side air bag, a message for correcting the posture is output to the notification terminal 9.

Effect of Embodiment

In this way, the human body information processing device C not only determines whether there is an occupant (whether the occupant is sitting in the seat) in the plurality of seats S in the vehicle based on the captured image from the camera 6, but also acquires the skeleton point coordinates for each occupant determined to be present and estimates the front coordinate of the occupant when viewed from the front regardless of the posture of the occupant. Then, the physique is determined based on the front coordinate estimated in this way, and necessary information is output to the notification terminal 9.

That is, when the physique of the occupant is directly determined based on the skeleton point coordinates of the occupant, an error of the determined physique increases because the skeleton point coordinates change greatly depending on the posture of the occupant. However, since the front coordinate that is an arrangement of the skeleton points from the front of the occupant is estimated and the physique is determined based on this estimation, an accuracy of the determined physique can be improved.

Further, when the front coordinate is estimated, since arrangements of the plurality of skeleton points are acquired as the skeleton point coordinates to overlap the two-dimensional coordinate system of the captured image and the distance information and the angle information are acquired in this two-dimensional coordinate system, the skeleton points are easy to acquire compared to, for example, acquiring the skeleton points of the occupant in a three-dimensional coordinate system, and the distance information and the angle information are fairly easy to acquire.

Further, the front coordinate estimation unit 23 performs machine learning by receiving the distance information that is a distance between a plurality of preset skeleton points among the plurality of skeleton points specified by the skeleton point coordinates, and the angle information that is an angle of a skeleton line obtained by connecting the plurality of the skeleton points specified by the skeleton point coordinates with respect to the reference line, so that the front coordinate in the two-dimensional coordinate system that is the arrangement of the skeleton points, when the occupant is viewed from the front is estimated and output. Therefore, high accurate estimation is implemented.

Other Embodiments

This disclosure may be configured as follows in addition to the embodiment described above (those having the same functions as those in the embodiment are denoted by the same reference numerals and signs as those in the embodiment).

Figure 11:
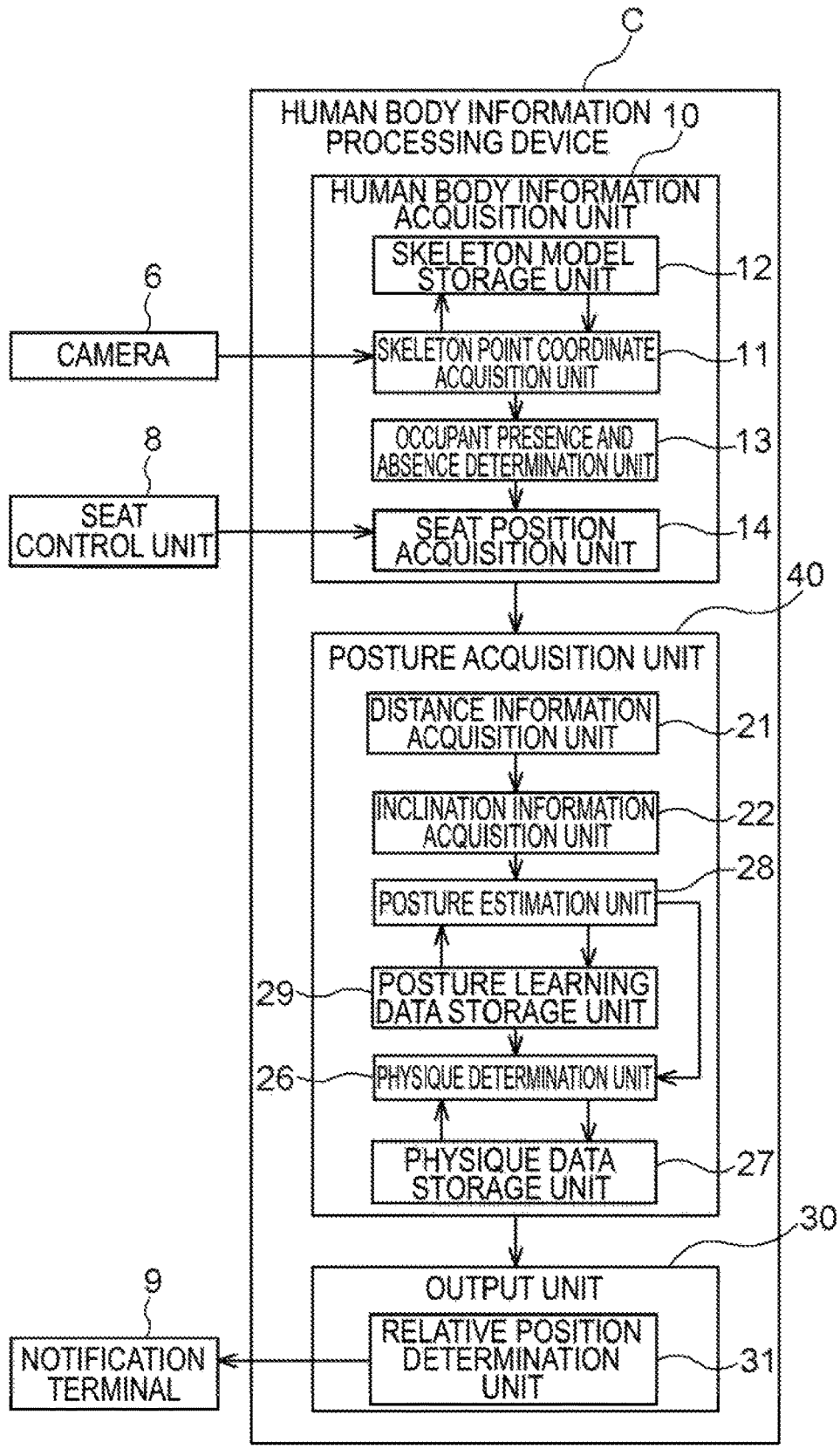
FIG. 11 is a block circuit diagram of a human body information processing device of an embodiment (a)

(a) As illustrated in FIG. 11, the human body information processing device C includes a posture acquisition unit 40 instead of the physique acquisition unit 20 among the configurations described in the embodiment.

In this embodiment (a), the human body information acquisition unit 10 and the output unit 30 are the same as those described in the embodiment, but the posture acquisition unit 40 is different from the one described the embodiment. That is, the posture acquisition unit 40 includes, as in the embodiment, the distance information acquisition unit 21, the inclination information acquisition unit 22, the physique determination unit 26, and the physique data storage unit 27. It is different from the embodiment in that the posture acquisition unit 40 includes a posture estimation unit 28 and a posture learning data storage unit 29, and does not include the front coordinate estimation unit 23, the learning data storage unit 24, or the posture determination unit 25 of the embodiment.

In a two-dimensional coordinate system of a captured image, the posture estimation unit 28 performs machine learning in association of a learning posture, in which a skeleton line obtained by connecting preset skeleton points among a plurality of skeleton point coordinates is inclined with respect to a reference line, and a posture of an occupant to estimate the posture of the occupant from the captured image.

In particular, when the captured image illustrated in FIG. 6 is described as an example, the spine line Lc in this figure is a reference line. When the captured image illustrated in FIG. 7 is described as an example, the reference line Lap and the waist line Lby in this figure are reference lines. When the captured image illustrated in FIG. 8 is described as an example, the shoulder line La of reference posture is a reference line.

Figure 12:
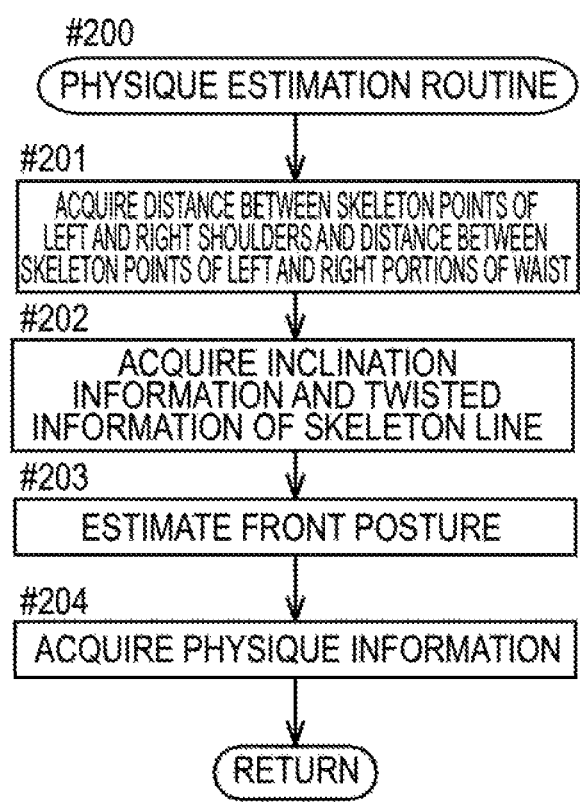
FIG. 12 is a flowchart of a physique estimation routine of the embodiment (a)

A control mode of the embodiment (a) the same as the basic control shown in the flowchart of FIG. 9 of the embodiment. However, as illustrated in a flowchart of FIG. 12, a control mode of step #203 of a control mode of a subroutine is different from the embodiment.

That is, in step #203, the posture estimation unit 28 estimates the posture of the occupant and a displacement amount of an upper body from the captured image with reference to learning data of the posture learning data storage unit 29 and based on distance information acquired by the distance information acquisition unit 21 and a plurality of skeleton point coordinates.

The posture learning data storage unit 29 stores data that enables the estimation of the posture of the occupant based on the distance information and inclination information of the skeleton point coordinates of the captured image. The posture of the occupant is assumed to be in the reference posture illustrated in FIG. 5, the forward leaning posture illustrated in FIG. 6, the lateral leaning posture illustrated in FIG. 7, the twisted posture illustrated in FIG. 8, and a composite posture that is a combination of at least two postures of the forward leaning posture, the lateral leaning posture, and the twisted posture. The posture learning data storage unit 29 also stores data that enables the estimation of the displacement amount of the upper body.

In this embodiment (a), in the step #204, based on the posture of the occupant estimated by the posture estimation unit 28, the physique determination unit 26 determines, with reference to the physique information of the physique data storage unit 27, to which of a plurality of types of physiques (for example, physiques divided by Subpart of the US NHTSA standard (49 CFR Part 572)), or to which piece of physique information divided into AF05, AM50, AM95, and the like as human body model standards the physique of the occupant in the captured image belongs.

With a configuration of the embodiment (a), the estimation of the posture of the upper body of the occupant is implemented by acquiring the distance information that is a distance between a plurality of preset skeleton points among the plurality of skeleton points specified by the skeleton point coordinates and the leaning posture in which the skeleton line obtained by connecting the preset skeleton points among the plurality of skeleton point coordinates based on the skeleton point coordinates acquired from the captured image is inclined with respect to the reference line. Further, since the physique of the occupant is determined based on the estimated posture of the occupant, for example, an error of the determined physique is reduced compared with a case in which the physique of the occupant is directly determined based on the plurality of skeleton points.

Figure 13:
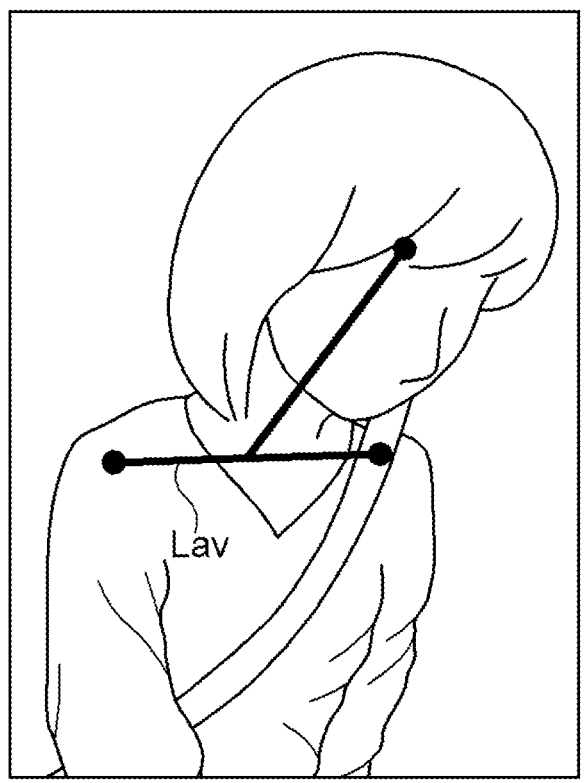
FIG. 13 illustrates a body image, skeleton points, and the like of an occupant in an embodiment (b).

(b) A processing mode is set such that even when the skeleton point coordinate acquisition unit 11 can acquire only skeleton point coordinates of an upper body of an occupant as illustrated in FIG. 13, the front coordinate estimation unit 23 estimates a front coordinate and the physique determination unit 26 determines a physique.

That is, in FIG. 13, coordinates of left and right shoulders are determined as a plurality of skeleton points of the upper body, and an upper-body shoulder line Lav is illustrated as a line obtained by connecting these skeleton points. A length of this upper-body shoulder line Lav is a distance between the skeleton points, and an angle of this upper-body shoulder line Lav with respect to a reference line (not illustrated) is angle information. Further, in order to implement this estimation, information on machine learning by the front coordinate estimation unit 23 is set such that a front coordinate can be estimated from the skeleton point coordinates of the upper body.

Therefore, the front coordinate of the occupant can be estimated to determine the physique even when only the upper body is reflected in the captured image like an occupant of the rear seat S3, or even when a lower body is covered with a blanket in the assistant passenger seat S2.

(c) A processing mode is set such that the physique determination unit 26 estimates a physique based on distance information of skeleton point coordinates of a front coordinate estimated by the front coordinate estimation unit 23. That is, by receiving the distance information of the skeleton point coordinates of the front coordinates, it is conceivable to perform machine learning to estimate and output the physique of an occupant. By performing machine learning in this way, it is possible to improve accuracy of the physique determined by the physique determination unit 26.

(d) A control mode may be set such that when a condition for outputting information to the notification terminal 9 is satisfied, the information is output only when a state in which the condition is satisfied continues beyond a set time. Accordingly, a frequency at which the information is output is reduced.

A feature configuration of a physique estimation device according to this disclosure includes a camera configured to capture an image of an inside of a vehicle, a skeleton point coordinate acquisition unit configured to acquire positions of a plurality of skeleton points of a body image of an occupant included in a captured image obtained by capturing an image of the inside by the camera as skeleton point coordinates in a two-dimensional coordinate system of the captured image, a front coordinate estimation unit machine learned such that, by receiving, distance information that is a distance between a plurality of preset skeleton points among the plurality of skeleton points specified by the skeleton point coordinates and angle information that is an angle of a skeleton line obtained by connecting the plurality of the skeleton points, specified by the skeleton point coordinates with respect to a reference line, a front coordinate that is an arrangement of the skeleton points when the occupant is viewed from front is estimated and output, and a physique determination unit configured to determine a physique of the occupant based on the front coordinate estimated by the front coordinate estimation unit.

According to this feature configuration, the skeleton point coordinate acquisition unit acquires the positions of the plurality of skeleton points of the occupant included in the captured image from the image captured by the camera as the skeleton point coordinates of the two-dimensional coordinate system, Next, the front coordinate estimation unit estimates the front coordinate when the occupant is viewed from front based on the distance information that is the distance between the plurality of preset skeleton points among the plurality of skeleton points and the angle information that is the angle of a skeleton line obtained by connecting the plurality of the skeleton points with respect to the reference line, and the physique determination unit determines the physique based on this estimation. That is, when the physique of the occupant is directly determined based on the plurality of skeleton points, an error may occur depending on a posture of the occupant. However, in this feature configuration, since the physique is estimated based on the front coordinate, the error can be reduced and the physique can be accurately determined.

In particular, in this configuration, the front coordinate estimation unit performs machine learning by receiving the distance information that is the distance between the plurality of preset skeleton points among the plurality of skeleton points and the angle information that is the angle of the skeleton line obtained by connecting the plurality of the skeleton points with respect to the reference line, so that the front coordinate that is the arrangement of the skeleton points when the occupant is viewed from front is estimated and output, which implements highly accurate estimation. Further, in this configuration, since the estimation is performed in the two-dimensional coordinate system based on the captured image without a configuration for distance measurement, for example, processing such as determining a positional relationship of the skeleton point coordinates in an assumed three-dimensional space is not necessary, an Increase in cost is prevented, and high-speed processing can be performed.

As a result, it is possible to provide a device that acquires the physique of the occupant when viewed from front from the body image included in the captured image inside the vehicle without causing an increase in cost.

As a configuration in addition to the above configuration, the distance information may be a distance between skeleton points on left and right shoulders of the occupant and a distance between skeleton points on left and right portions of a waist of the occupant.

As a configuration in addition to the above configuration, the angle information may be an angle of a spine line along a spine of the occupant with respect to a reference spine line.

As a configuration in addition to the above configuration, the angle information may be an angle of a shoulder line obtained by connecting skeleton points on left and right shoulders of the occupant with respect to a reference shoulder line.

As a configuration in addition to the above configuration, the angle inform may be an angle of a spine line along a spine of the occupant with respect to a waist line obtained by connecting skeleton points of left and right portions of a waist of the occupant.

As a configuration in addition to the above configuration, the physique to estimation device may further include a physique storage unit configured to store physiques divided into a plurality of types of physiques stored in the physique storage unit the physique of the occupant belongs to.

Accordingly, the physique storage unit stores a plurality of types of physiques (for example, physiques divided by Subpart of the US NHTSA standard (49 CFR Part 572)), or physiques divided into AF05, AM50, AM95, and the like as human body model standards. The physique determination unit can determine which of the plurality of types of physiques stored in the physique storage unit the estimated physique belongs to, and can also grasp a height, a weight, and the like.

As a configuration in addition to the above configuration, the physique estimation device may further include a seat position acquisition unit configured to acquire a position of a seat base and a leaning posture of a seat back of a seat in the vehicle, and a correction unit configured to correct the skeleton point coordinates based on information acquired by the seat position acquisition unit.

Accordingly, by acquiring the position of the seat base and the leaning posture of the seat back of the seat by the seat position acquisition unit, the correction unit can correct, for example, the skeleton point coordinates to acquire skeleton point coordinates for a plurality of occupants similar to skeleton point coordinates of occupants seated in seats assumed in advance, and can acquire a proper physique.

As a configuration in addition to the above configuration, the physique estimation device may further include a posture determination unit configured to determine, based on the angle information, a posture of an upper body of the occupant seated in a seat in the vehicle.

Accordingly, the posture determination unit can determine an inclination direction and an inclination angle of the upper body of the occupant seated in the seat. Accordingly, necessary messages and alarms can be output based on a positional relationship between the upper body of the occupant seated in the seat and a side air bag.

As a configuration in addition to the above configuration, the skeleton point coordinate acquisition unit may acquire the skeleton point coordinates of an upper body of the occupant seated in a seat in the vehicle, and the front coordinate estimation unit may estimate the front coordinate based on the skeleton point coordinates of the upper body acquired by the skeleton point coordinate acquisition unit.

Accordingly, since the front coordinate can be estimated only by the upper body of the occupant included in the image captured by the camera, the front coordinate that is the arrangement of the skeleton points when viewed from front can be estimated no matter which seat the occupant is seated in.

A feature configuration of the posture estimation device according to this disclosure includes a camera configured to capture an image of an inside of a vehicle, a skeleton point coordinate acquisition unit configured to acquire positions of a plurality of skeleton points of a body image of want included in a captured image obtained by capturing an image of the inside by the camera as skeleton point coordinates in a two-dimensional coordinate system of the captured image, and a posture estimation unit machine learned such that, by receiving distance information that is a distance between a plurality of preset skeleton points among the plurality of skeleton points specified by the skeleton point coordinates and angle information that is an angle of a skeleton line obtained by connecting the plurality of the skeleton points specified by the skeleton point coordinates with respect to a reference line, a posture of the occupant is estimated and output.

According to his feature configuration, the skeleton point coordinate acquisition unit acquires the positions of the plurality of skeleton points of the occupant included in the captured image from the image captured by the camera as the skeleton point coordinates of the two-dimensional coordinate system. Next, the posture of the occupant is estimated based on the distance information that is the distance between the plurality of preset skeleton points among the plurality of skeleton points and the angle information of the skeleton line obtained by connecting the plurality of skeleton points with respect to the reference line. That is, the posture estimation unit implements highly accurate estimation by machine learning to estimate and output the posture of the occupant by receiving the distance information and the angle information. Further, in this configuration, since the captured image is processed only by the two-dimensional coordinate system without a configuration for distance measurement, cost increase can be prevented.

As a result, it is possible to provide a device that estimates the posture of the occupant from an occupant image included in the captured image of the inside of the vehicle without causing an increase in cost.

As a configuration in addition to the above configuration, the physique estimation device may further include a seat position acquisition unit configured to acquire a position of a seat base and a leaning posture of a seat back of a seat in the vehicle, and a correction unit configured to correct the skeleton point coordinates based on information acquired by the seat position acquisition unit.

Accordingly, by acquiring the position of the seat base and the leaning posture of the seat back of the seat by the seat position acquisition unit, the correction unit can correct, for example, the skeleton point coordinates to acquire skeleton point coordinates for a plurality of occupants similar to skeleton point coordinates of occupants seated in seats assumed in advance, and can acquire a proper posture.

As a configuration in addition to the above configuration, the posture estimation device may further include a physique determination unit configured to determine a physique of the occupant based on the posture estimated by the posture estimation unit.

Accordingly, from the posture estimated by the posture estimation unit, the physique determination unit can determine the physique by, for example, processing of obtaining a posture without leaning.

As a configuration in addition to the above configuration, the distance information may be a distance between skeleton points on ft and right shoulders of the occupant and a distance between skeleton points on left and right portions of a waist of the occupant. The angle information may be an angle, of a spine line along a spine of the occupant with respect to a reference spine line. The angle information may be an angle of a shoulder line obtained by connecting the skeleton points on the left and right shoulders of the occupant with respect to a reference shoulder line. The angle information may be an angle of the spine line along the spine of the occupant with respect to a waist line obtained by connecting the skeleton points of left and right portions of the waist of the occupant. In this way, the front coordinate can be estimated based on the distance information and the angle information.

INDUSTRIAL APPLICABILITY

This disclosure can be used as a device that estimates a physique of an occupant captured by a camera that captures an image of an inside of a vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A physique estimation device comprising:
   a camera configured to capture an image of an inside of a vehicle; and
   circuitry configured to:
   acquire positions of a plurality of skeleton points of a body image of an occupant included in a captured image obtained by capturing an image of the inside by the camera as skeleton point coordinates in a two-dimensional coordinate system of the captured image;
   apply a machine learned parameter to distance information that is a distance between a plurality of preset skeleton points among the plurality of skeleton points specified by the skeleton point coordinates and angle information that is an angle of a skeleton line obtained by connecting the plurality of the skeleton points specified by the skeleton point coordinates with respect to a reference line to estimate a front coordinate in the two-dimensional coordinate system that is an arrangement of the plurality of skeleton points whose positions were acquired by capturing the image when the occupant is viewed from front; and determine a physique of the occupant based on the estimated front coordinate.

2. The physique estimation device according to claim 1, wherein the distance information is a distance between skeleton points on left and right shoulders of the occupant and a distance between skeleton points on left and right portions of a waist of the occupant.

3. The physique estimation device according to claim 1 wherein the angle information is an angle of a spine line along a spine of the occupant with respect to a reference spine line.

4. The physique estimation device according to claim 1, wherein the angle information is an angle of a shoulder line obtained by connecting skeleton points on left and right shoulders of the occupant with respect to a reference shoulder line.

5. The physique estimation device according to claim 1, wherein the angle information is an angle of a spine line along a spine of the occupant with respect to a waist line obtained by connecting skeleton points of left and right portions of a waist of the occupant.

6. The physique estimation device according to claim 1, wherein the circuitry is configured to:

store physiques divided into a plurality of types of physiques; and determine which of the plurality of types of physiques the physique of the occupant belongs to.

7. The physique estimation device according to claim 1, wherein the circuitry is configured to:

acquire a position of a seat base and a leaning posture of a seat back of a seat in the vehicle; and correct the skeleton point coordinates based on the position of the seat base and the leaning posture of the seat back.

8. The physique estimation device according to claim 1, wherein the circuitry is configured to determine, based on the angle information, a posture of an upper body of the occupant seated in a seat in the vehicle.

9. The physique estimation device according to claim 1, wherein the circuitry is configured to:

acquire the skeleton point coordinates of an upper body of the occupant seated in a seat in the vehicle; and estimate the front coordinate based on the skeleton point coordinates of the upper body.

10. A posture estimation device comprising:

a camera configured to capture an image of an inside of a vehicle; and circuitry configured to:

acquire positions of a plurality of skeleton points of a body image of an occupant included in a captured image obtained by capturing an image of the inside by the camera as skeleton point coordinates in a two-dimensional coordinate system of the captured image;

acquire a position of a seat base and a leaning posture of a seat back of a seat in the vehicle;

correct the skeleton point coordinates in the two-dimensional coordinate system of the captured image based on the position of the seat base and the leaning posture of the seat back; and estimate, with reference to machine learned data, a posture of the occupant based on distance information that is a distance between a plurality of preset skeleton points among the plurality of skeleton points specified by the skeleton point coordinates and angle information that is an angle of a skeleton line obtained by connecting the plurality of the skeleton points specified by the corrected skeleton point coordinates with respect to a reference line.

11. The posture estimation device according to claim 10, wherein the circuitry is configured to determine a physique of the occupant based on the estimated posture.

* * * * *